March 29, 1949. H. F. PARKER 2,465,659
ANTISKID CHAIN LINK
Filed Aug. 27, 1947

INVENTOR
Humphrey F. Parker
BY
Bean, Brooks, Buckley & Bean.
ATTORNEYS

Patented Mar. 29, 1949

2,465,659

UNITED STATES PATENT OFFICE 2,465,659

ANTISKID CHAIN LINK

Humphrey F. Parker, Buffalo, N. Y., assignor to Columbus McKinnon Chain Corporation, Tonawanda, N. Y.

Application August 27, 1947, Serial No. 770,829

7 Claims. (Cl. 152—243)

This invention relates to antiskid chains for motor vehicles, and more particularly to improvements in the links of the cross chains thereof.

The invention relates to an antiskid device of the type comprising metal chains disposed crosswise of a vehicle tire so that as the vehicle wheel rotates the tire rolls over the cross chains successively, thereby pressing the cross chains against the road surface so as to grip the latter for skid prevention purposes. However, in the case of the present invention the links of the cross chains are formed of metal stock which is of novel sectional shape, whereby to obtain improved road surface gripping effects as well as increased resistance to wear and/or bending and/or fracturing of the cross chain links under road impact and abrasion stresses such as are encountered in service.

Therefore, it is a primary object of the invention to provide an improved cross chain link whereby to obtain the features and advantages set forth hereinabove.

Another more specific object of the invention is to provide a cross chain link formed of metal stock having a sectional shape of novel form whereby to obtain improved resistance to abrasion-wearing of the chain link during the earlier stages of the chain link life.

Another specific object of the invention is to provide an improved cross chain link which is formed of metal stock of novel sectional shape whereby to provide the chain link during the the latter stages of its operational life with improved resistance to bending and/or fracturing under service conditions.

Another specific object of the invention is to provide a novel cross chain link combining the features and advantages set forth hereinabove with improved road surface gripping characteristics, for optimum service and antiskid performance.

Other objects and advantages of the invention will appear in the specification hereinafter.

Figure 5:
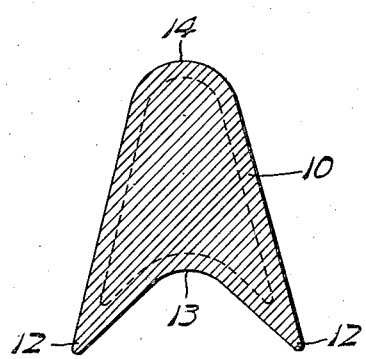
Fig. 5 is an enlarged view in cross section of one leg of a link of the invention; showing the sectional shape and case hardened areas thereof prior to service wearing of the link.
Figure 3:
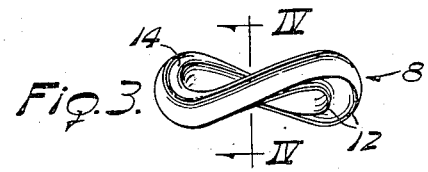
Fig. 3 is an edge view of one of the cross chain links.
Figure 4:
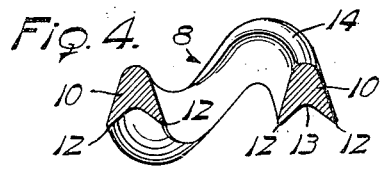
Fig. 4 is a cross section of a link constructed in accord with the invention.
Figure 6:
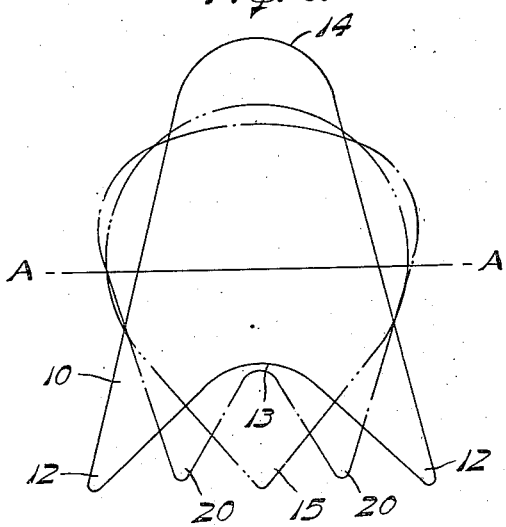
Figure 7:
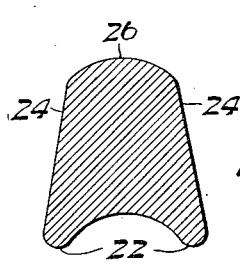

Fig. 6 is a composite diagrammatic sectional view showing in superposed relation and in the same scale the sectional shapes of the link stock of Fig. 5 and of two previously known link stocks; illustrating comparatively the road surface engaging and wear resisting and bending resisting characteristics thereof; and Fig. 7 is a view similar to Fig. 5, showing a modified form of link stock of the invention.

The present invention contemplates improvements in antiskid cross chain links of the type disclosed for example in applicant's predecessor's U. S. Patent No. 1,786,318, which issued December 23, 1930. Whereas, the chain link disclosed in the prior patent aforesaid was designed to provide an improved "biting" into the road or road ice to prevent skidding, it has been found that it would be advantageous if the life of the biting ridge portions of such links could be prolonged. The present invention provides a novel link stock sectional shape whereby an improved "bite" into the road surface is provided both initially and substantially throughout the effective life of the link. The invention also provides a more effective use of the case hardening principle when applied to cross chain links, whereby the chain link of the invention possesses increased resistance to abrasion wearing throughout substantially the entire range of its effective life. Also, the chain link of the invention is so shaped that as the link becomes worn so as to approach the end of its effective life, the sectional shape of the then remaining link stock is such as to provide the worn link with improved resistance to bending and/or impact shock fracturing.

Figure 1:
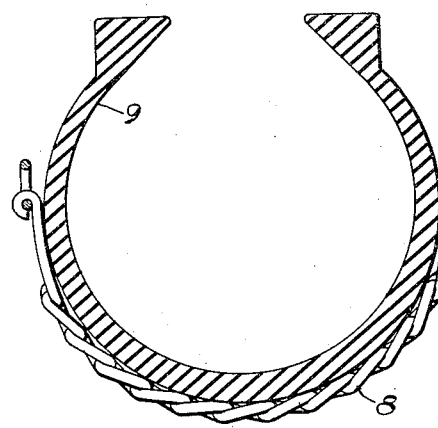
Fig. 1 illustrates a cross chain of the invention, as it appears applied to an automobile tire, the latter being in cross section.
Figure 2:
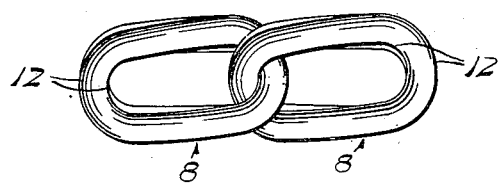
Fig. 2 is a closeup view of a portion of the cross chain.

The above features and advantages are obtained by constructing a cross chain comprising links 8, adapted to be mounted upon a vehicle tire 9 as illustrated in Fig. 1; the cross chain links 8 being formed of metal stock having a sectional shape, for example, as illustrated at 10 in Fig. 5, wherein it is seen that the bottom or road surface contacting portion of the link is of bifurcated form so as to present to the road surface parallel ridges indicated at 12—12 in the drawing. More specifically the stock piece which is illustrated in Fig. 5 is sectionally shaped so that the ridges 12—12 are relatively far apart and their inner walls are substantially flat shaped to a depth equal to approximately one-fourth of the overall depth of the stock section. At their upper ends the inner walls of the ridges 12—12 are interconnected by a filleting curved portion 13 (Fig. 5). The outer walls of the ridge portions 12—12 are all substantially flat and extend upwardly in converging directions throughout the greater part of the sectional height of the stock piece, and are joined by an upper cap portion of the stock piece which is smoothly rounded over as indicated at 14 in continuation of the upwardly converging side walls, whereby the vehicle tire contacting portions of the link sections are of smoothly rounded surface form. Thus, as illustrated by Fig. 6, the sectional shape of the link stock piece of Fig. 5 is characterized by providing a pair of relatively widely spaced road surface contacting ridges, compared to the single ridge formation of the sectional shape 15 as disclosed in U. S. Patent No. 1,786,318; and as distinguished from a relatively closely spaced dual ridge arrangement as illustrated for example in the sectional shape designated 20.

Also, as illustrated diagrammatically by Fig. 6, the sectional shape of the present invention distinguishes from such other arrangements in that the outer walls thereof converge inwardly and upwardly and terminate in a relatively narrow crown or top portion, thereby providing a greater total sectional height compared to the sectional shapes 15—20 for the same sectional area of metal used. In Fig. 6 the sectional shapes 10—15—20 are drawn to the same scale to possess the same sectional areas. The sections 10—15—20 are vertically disposed in the drawing relative to line A—A thereof so that in each case the sectional area of metal is bisected by the horizontal line A—A. Consequently, it will be appreciated that as the link of the invention becomes worn, say to such degree that one-half of the metal thereof is removed, the remaining metal will be disposed so as to provide a beam having greater sectional depth than in the case of either of the sectional shapes 15—20 when worn to similar degree.

It is of course well known in the nonskid chain art that cross chain links never last until they are completely worn through and that their ultimate failure is due to fracturing at their thinly worn portions. Conventionally, such fracturing commences to take place when approximately one-half of the link section metal has been worn away and it is believed that such fracturing of the partly worn link is due to fatigue resulting from road impact shock and bending stresses imposed thereon as the vehicle tire rolls over the link. Thus, it will be understood that the relatively deeper sectional shape of the remaining top half of the link of the present invention will provide greater resistance to such fracturing of the residual portion of the link subsequent to partial wearing thereof, whereby a link designed in accord with the present invention and employing the same amount of metal as in the case of links of other designs will possess a longer useful life.

Reference to Fig. 5 of the drawing will show that the broadened base surface of the link design of the present invention will result in presenting to the road surface, substantially throughout the range of useful life of the link, a larger volume of case hardened metal, than in the other designs such as are illustrated comparatively in Fig. 6; assuming the depth of the case hardening to extend the same distance in all cases. Thus, it will be appreciated that the invention provides a further advantage with respect to resistance to abrasion-wearing of the chain links due to sliding contacts against hard road surfaces, which results in retarding the wearing away of the first one-half portion of the link metal.

Fig. 7 illustrates a modified form of sectional shape for the chain link stock, wherein the road contacting face comprises opposite ridges 22—22 and the side walls 24—24 converge upwardly and inwardly and lead into the crown or top portion 26 of the link section which is flattened to provide a broader base in contact with the vehicle tire.

Therefore, it will be appreciated that the present invention provides in cross chain links a novel sectional shape design, whereby when using the same amount of metal the chain link of the present invention will provide increased road bite and resistance to skidding; increased resistance to abrasion wear during most of the effective life of the link; increased resistance to fracturing of the link subsequent to substantial wearing away thereof; and overall, an increased effective life for the skid chain employing a given amount and kind of metal.

I claim:

1. In an antiskid chain, a cross chain comprising chain links formed of stock metal sectionally shaped so as to comprise in each case a bottom portion presenting to the road surface a pair of parallel ridge-like edges running along the opposite corners of said bottom portion, said ridges having substantially straight outer side walls converging throughout the greater part of the sectional height of said stock in a direction away from said bottom portion the inner side wall portions of said ridges being substantially straight and extending away from said bottom portion in converging relation and interconnected at their ends remote from said bottom portion by a concave surface, said stock being case-hardened.

2. In an antiskid chain, a cross chain comprising chain links formed of stock metal sectionally shaped so as to comprise in each instance a bottom portion presenting to the road surface a pair of spaced ridges running along the outer edges of said bottom portion, said ridges having substantially straight outer side walls converging in a direction away from said bottom portion, the inner side walls of said ridges being substantially straight and converging in a direction away from said bottom portion throughout approximately one-fourth of the sectional height of said stock and interconnected at their ends remote from said bottom portion by a concave surface.

3. In an antiskid chain, a cross chain comprising chain links formed of stock metal sectionally shaped so as to comprise a bottom portion presenting to the road surface a pair of spaced ridges running along the outer edges of said bottom portion, said ridges having their outer side walls relatively converging in a direction away from said bottom portion throughout approximately three quarters of the sectional height of said stock and interconnected at their end portions remote from said bottom portion by a rounded crown surface portion, the inner side wall portions of said ridges being relatively converging in a direction away from said bottom portion throughout approximately one-fourth of the sectional height of said stock and interconnected by a curved surface, said stock being case-hardened.

4. In an antiskid chain, a cross chain link formed of stock metal sectionally shaped so as to comprise a bottom portion presenting to the road surface a pair of spaced ridges, said ridges having their outer side walls extending in directions relatively converging away from said bottom portion, the inner side wall portions of said ridges being also arranged to extend in directions relatively converging away from said bottom portion, said stock being case-hardened.

5. In an antiskid chain, a cross chain link formed of stock metal sectionally shaped so as to comprise a bottom portion presenting to the road surface a pair of spacer ridges, said ridges having their outer side walls extending in directions relatively converging away from said bottom portion, the inner side wall portions of said ridges being also arranged to extend in directions relatively converging away from said bottom portion.

6. In an antiskid chain, a cross chain link having a bottom road contacting face comprising a pair of spaced ridge-like edges, the side faces of said link contiguous to said bottom road contacting face being extended from said edges in directions converging away from said bottom road contacting face therefrom.

7. In an antiskid chain, a cross chain link having a bottom road contacting face comprising a pair of spaced ridge-like edges, the side faces of said link contiguous to said bottom road contacting face being extended from said edges in directions converging away from said bottom road contacting face therefrom, said link being surface-hardened.

HUMPHREY F. PARKER.

REFERENCES CITED

The following references are of record in the file of this patent:

FOREIGN PATENTS

| Number | Country | Date |
| --- | --- | --- |
| 159,828 | Switzerland | Jan. 31, 1933 |